US008082402B2

(12) United States Patent
Noyle

(10) Patent No.: US 8,082,402 B2
(45) **Date of Patent: *Dec. 20, 2011**

(54) SYSTEM AND METHOD FOR USING VIRTUAL MEMORY FOR REDIRECTING AUXILIARY MEMORY OPERATIONS

(75) Inventor: Jeffrey M. J. Noyle, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1125 days.

This patent is subject to a terminal disclaimer.

(21) Appl. No.: 11/364,691

(22) Filed: Feb. 27, 2006

(65) Prior Publication Data

US 2006/0149907 A1 Jul. 6, 2006

Related U.S. Application Data

(63) Continuation of application No. 10/184,792, filed on Jun. 28, 2002, now Pat. No. 7,007,139.

(51) Int. Cl.
*G06F 12/00* (2006.01)

(52) U.S. Cl. ........................................ 711/154; 711/118

(58) Field of Classification Search ........................ None
See application file for complete search history.

(56) References Cited

U.S. PATENT DOCUMENTS

| | | | | |
|---|---|---|---|---|
| 6,112,267 | A | 8/2000 | McCormack et al. | 710/52 |
| 6,263,412 | B1 | 7/2001 | Townsend | 711/170 |
| 6,518,973 | B1 | 2/2003 | Blythe | 345/564 |
| 7,007,139 | B2 | 2/2006 | Noyle | 711/154 |
| 2002/0097727 | A1* | 7/2002 | Prakash | 370/395.42 |
| 2006/0203570 | A1* | 9/2006 | Meier et al. | 365/189.05 |

OTHER PUBLICATIONS

Lee, H.H. et al., "Improving Bandwidth Utilization Using Eager Writeback", *Journal of Instruction-Level Parallelism*, 2001, 3, 1-22.

* cited by examiner

*Primary Examiner* — Denise Tran
(74) *Attorney, Agent, or Firm* — Woodcook Washburn LLP

(57) ABSTRACT

A method for using virtual memory for redirecting auxiliary memory operations redirects the auxiliary memory write operations of a process to a buffer after capturing the state of the auxiliary memory at various times during the method in three buffers. After the write operations have ended, the auxiliary memory is reconstructed into one of the buffers by comparing the contents of the buffers to each other. The reconstructed memory is then available when the process next regains control of the auxiliary memory.

19 Claims, 8 Drawing Sheets

SYSTEM AND METHOD FOR USING VIRTUAL MEMORY FOR REDIRECTING AUXILIARY MEMORY OPERATIONS

CROSS-REFERENCE TO RELATED CASES

This application is a continuation application and claims priority to application Ser. No. 10/184,792 filed on Jun. 28, 2002 now U.S. Pat. No. 7,007,139, issued Feb. 28, 2006, entitled "SYSTEM AND METHOD FOR USING VIRTUAL MEMORY FOR REDIRECTING AUXILLIARY MEMORY OPERATIONS", which is hereby incorporated by reference in its entirety.

FIELD OF THE INVENTION

This invention relates to the field of memory systems, and in particular to a system and method for managing the use of memory such as video memory.

BACKGROUND

Computer systems may have both a general-purpose memory and one or more auxiliary or special-purpose memories. One example of such an auxiliary memory is an auxiliary memory used by a graphics subsystem, known as graphics memory or video memory. When a graphics subsystem has dedicated to it a graphics memory that is only used for graphics display purposes, that graphics memory may provide increased efficiency, especially if the memory is optimized for high-performance in use with the computer's display.

Different processes or threads may want to write information into an auxiliary memory. Access to the auxiliary memory is handled by some managing entity in the computer, often within the operating system. Concurrent access to the auxiliary memory by multiple processes or threads may be unproblematic. However, in certain situations, it is desirable to allow only one process or thread to write to the auxiliary memory at once.

One example of such a situation is when a process will reset or erase the auxiliary memory. In a graphics application, this may occur when the display needs to be reinitialized. For example, in a mode switch, such as a mode switch for a change in display resolution or color fidelity, a reset or erasure of graphics memory is necessary.

If a first process is accessing the graphics memory for reading or writing data, and a mode-switching second process will reinitialize the graphics memory, at least two possibilities exist in the prior art for handling access by the threads to the graphics memory.

A first possibility is to allow these processes to run concurrently. This technique presents two problems. First, if the first process reads data from locations that have been erased due to the mode-switching second process, errors may occur in the first process. Second, if the first process writes data to the graphics memory, this data may be lost when the mode-switching second process erases the graphics memory. As a result, such data may need to be regenerated by the first process for display. The user may experience a delay or error due to allowing both processes to run concurrently.

A second possibility for handling access by multiple threads to the graphics memory is to have the mode-switching process wait for the first process to conclude or respond to an interrupt request before it acts on the graphics memory. This, however, may cause a delay that may be noticeable to the user.

In view of the foregoing, there is a need for a technique that overcomes the drawbacks of the prior art.

SUMMARY OF THE INVENTION

In accordance with the present invention, a system and method is provided that allows a first process that is writing to an auxiliary memory to continue writing, without necessitating either an interruption for a second process or a recreation by the first process of write operations to auxiliary memory that it had already performed.

The process writing to the auxiliary memory is redirected to write instead to a memory buffer located outside of the auxiliary memory. This redirection preferably occurs transparently to the process. The process continues issuing write commands as before, and receives no information that the redirection is occurring, but the writes are redirected to one of three memory buffers. This buffer thus serves as virtual auxiliary memory. The other two buffers are used to maintain copies of the auxiliary memory at different phases (before and after redirection) of the setup operations that allow the switch from auxiliary memory to the virtual auxiliary memory.

At an appropriate time, for example, when the process has finished write operations, a reconstruction of the auxiliary memory is performed from the buffers. This reconstruction results in a buffer containing the data that the auxiliary memory would have contained had the process continued to write directly to the auxiliary memory. This reconstruction can then be written to the auxiliary memory. In this way, the buffers allow the switch from writing to auxiliary memory to writing to virtual auxiliary memory to be performed transparently to the process that is issuing the write commands.

The process of using the buffers works as follows: one buffer of the three is used to capture auxiliary memory while write operations are still being directed to the auxiliary memory. When the copy into the first buffer has been completed and while write operations continue to be directed to the auxiliary memory, a duplicate copy of the first buffer is made to a second buffer. Data written by the writing process is then redirected to the first buffer rather than to auxiliary memory. At this point a copy is made of the auxiliary memory into a third buffer. This copy of the auxiliary memory captures the results of write operations that may have occurred to the auxiliary memory during the copy to the first buffer or the duplication of the first buffer in the second buffer.

The writing process continues to write into the first buffer and the auxiliary memory is released for other uses. When the writing process signals that it has finished writing to auxiliary memory, the three buffers are resolved to create a buffer that duplicates what the portion of auxiliary memory would have contained if the process had retained control of auxiliary memory.

Other aspects of the present invention are described below.

BRIEF DESCRIPTION OF THE DRAWINGS

The foregoing summary, as well as the following detailed description of presently preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention provides a technique for allowing write operations to the auxiliary memory to be redirected to virtual auxiliary memory without necessitating an interruption in the process that issues the write operations.

The virtual auxiliary memory is contained in a set of buffers that both store the information written by the process issuing the write operations and store the state of the auxiliary memory at different stages during the redirection process. In this way, the state of the auxiliary memory that would have been present had no redirection occurred can be reconstructed from the data in the buffers.

Exemplary Computing Environment

Figure 1:
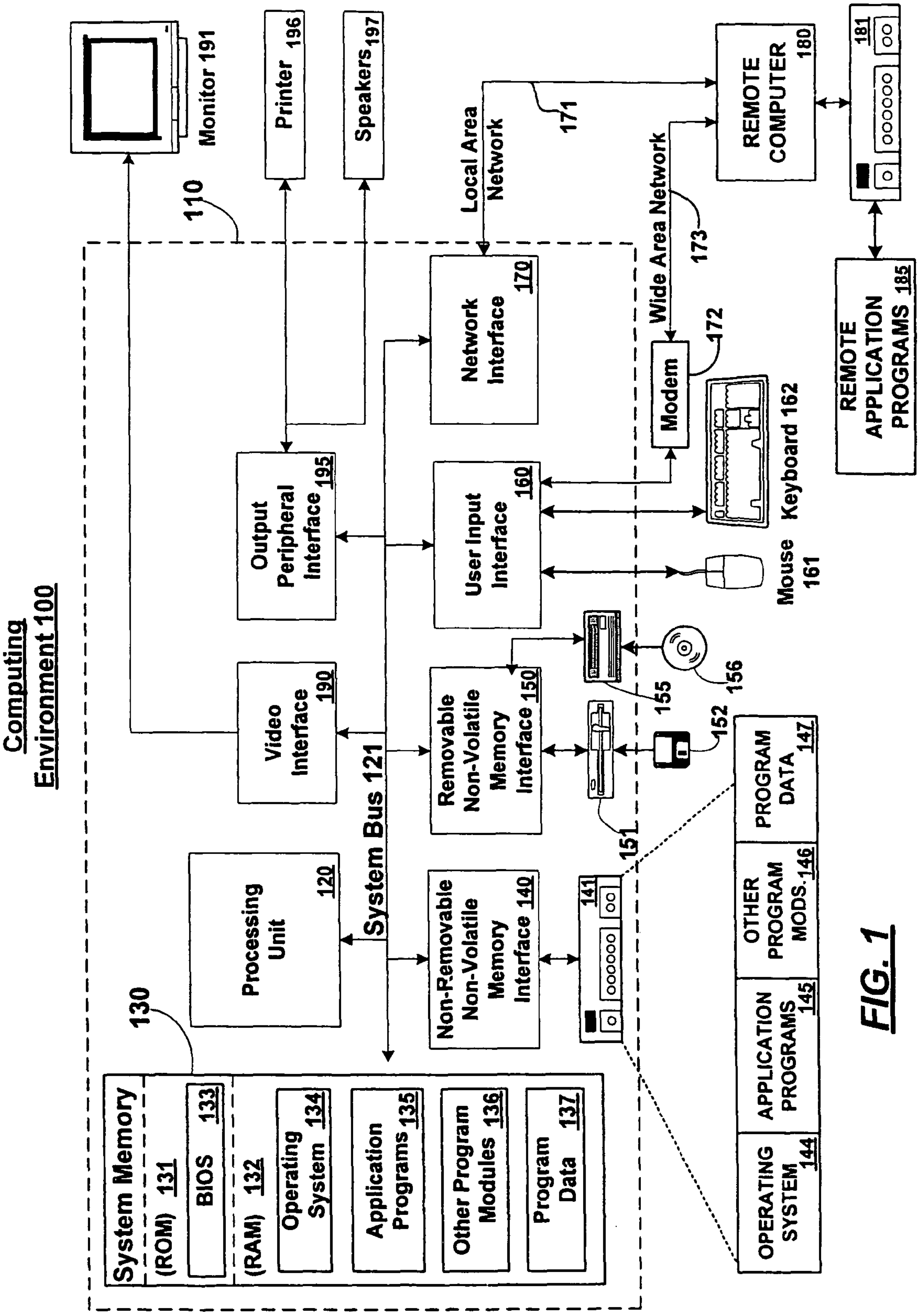
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Uninterrupted Writing of Auxiliary Memory

Figure 2:
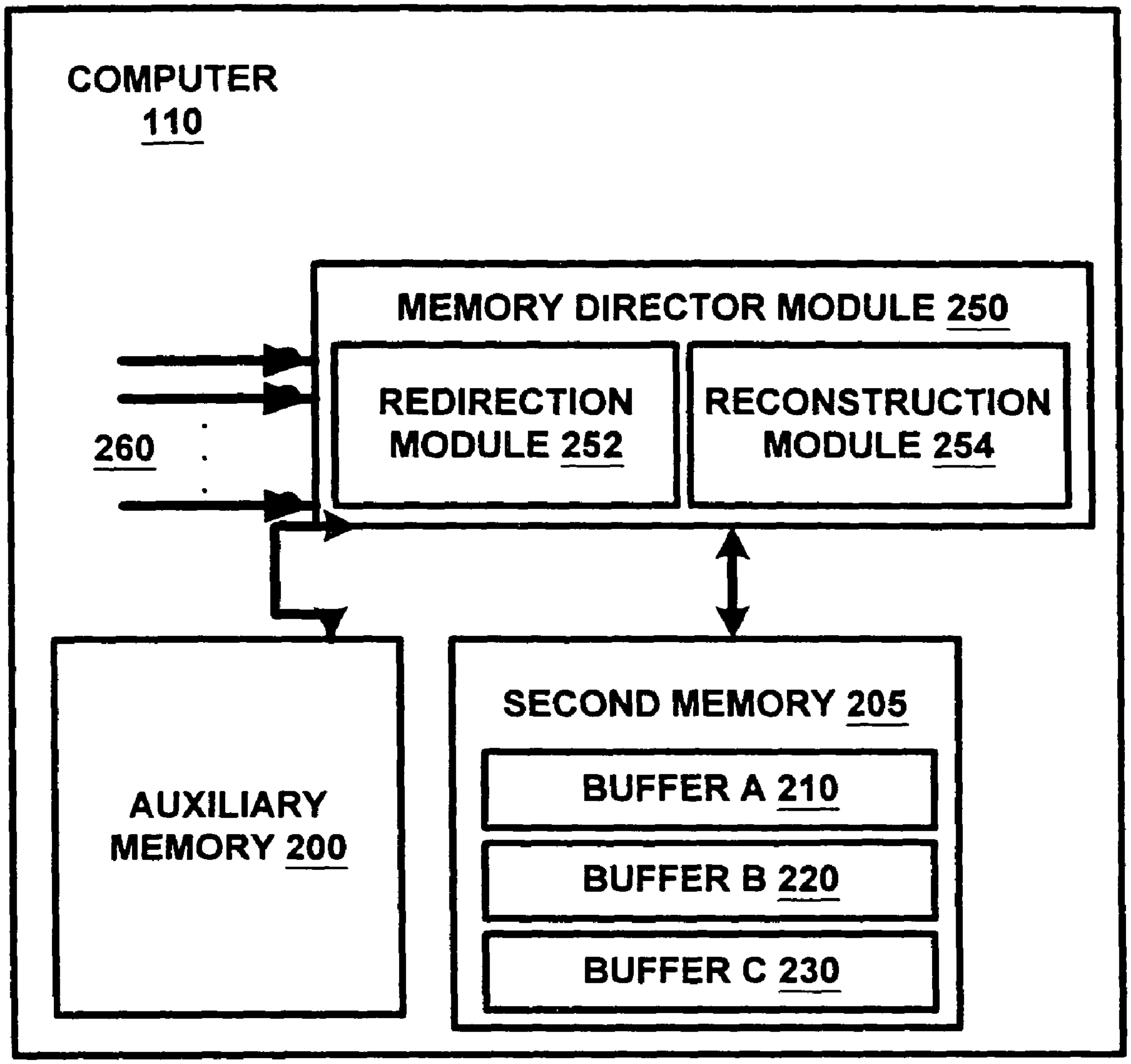
FIG. 2 is a block diagram of the modules of the computer which perform the inventive technique.

FIG. 2 illustrates an exemplary system that may be used to embody the invention. Within computer 110, a memory director module 250 controls access to auxiliary memory 200. The memory director module 250 also has access to a second memory 205, which contains three buffers, buffer A 210, buffer B 220, and buffer C 230. Threads or processes 260 that wish to access the auxiliary memory 200 do so through the intermediation of memory director module 250. Where auxiliary memory 200 is a graphics memory, monitor 191 (from FIG. 1) may be directly connected to auxiliary memory 200 for display of the information in auxiliary memory 200.

In one embodiment of the invention, when a process 260 is writing to auxiliary memory 200 and the need arises to evict the process 260 from writing to auxiliary memory 200 before the process can finish or handle an interrupt, space is allocated in second memory 205 (which may be RAM 132, shown in FIG. 1) to accommodate three buffers (which will be referred to as buffers A 210, B 220, and C 230). In one embodiment of the invention, the second memory 205 is lower performance memory than auxiliary memory 200.

The three buffers (210-230) act as virtual auxiliary memory. They must be sufficiently large to hold the contents of the portion of the auxiliary memory 200 being used by the process 260.

The memory director module 250 may contain a redirection module 252, which controls the redirection of writes from a process 260 to the virtual auxiliary memory. The memory director module 250 may also contain a reconstruction module 254 which controls the reconstruction from the buffers (210-230) of what the contents of auxiliary memory 200 would have been had no redirection occurred. It should be understood that the memory director module 250 depicted in FIG. 2 is merely exemplary of a convenient structure that can embody the invention. The invention can, alternatively, be embodied in any system adapted to perform the redirection and reconstruction functions described below. Such a system need not contain a separate memory director module 250 or separate redirection and reconstruction modules 252 and 254.

Technique of Redirection and Reconstruction

Figure 8:
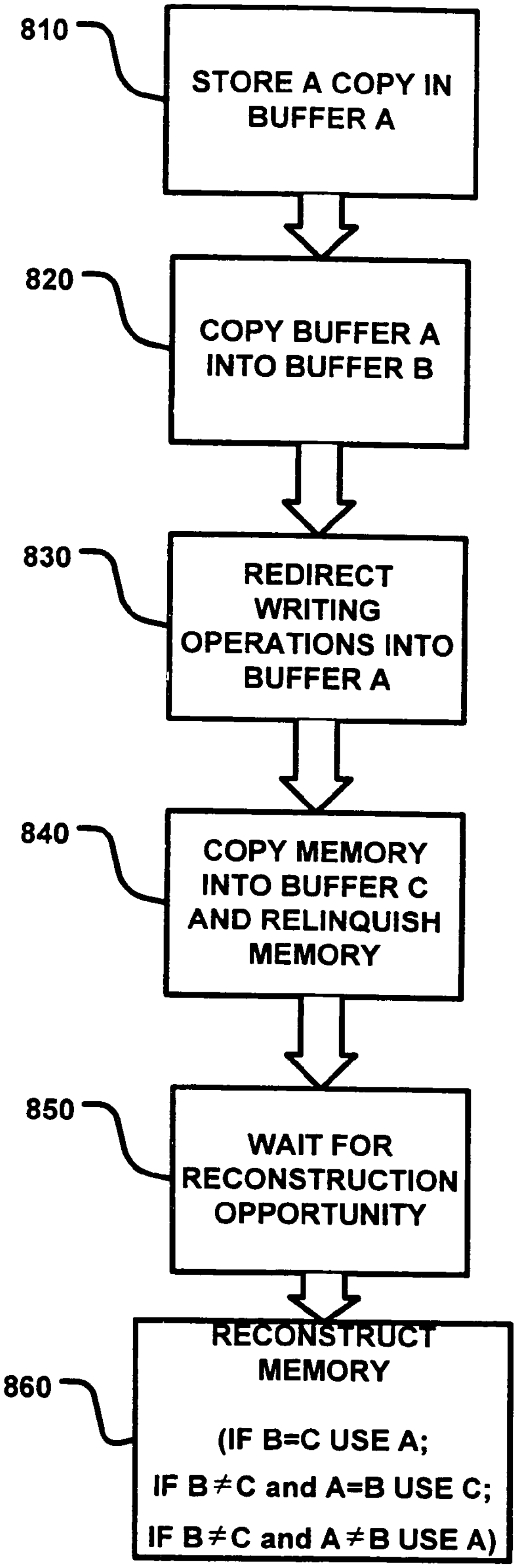
FIG. 8 is a flow diagram of a preferred embodiment of the inventive method.

FIG. 8 describes the inventive technique. This technique is carried out when a process using auxiliary memory must be evicted from the auxiliary memory (200 in FIG. 2), and allows that eviction to take place transparently to the process.

As shown in step 810, a copy of the portion of auxiliary memory (200 in FIG. 2) being used by the process (260 in FIG. 2) is stored in buffer A (210 in FIG. 2). This is done in order to store the state of auxiliary memory (200 in FIG. 2) before any redirection occurs. This "redirection buffer" is the location to which memory operations will be redirected. As shown in step 820, a second copy is stored in buffer B (220 in FIG. 2). This copy of the pre-redirection auxiliary memory will be stored as a "pre-redirection buffer." Once these copies are made, in step 830, writing operations by the process (260 in FIG. 2) are redirected to buffer A (210 in FIG. 2). At this point, an unchanged copy of the auxiliary memory in a pre-redirection state is stored in buffer B (220 in FIG. 2) and another copy is being written into by the process in buffer A (210 in FIG. 2).

While the copying and redirection were being performed, more write operations may have occurred. In order to capture these operations, in step 840, a third copy of the auxiliary memory in the state after redirection is made into buffer C (230 in FIG. 2)—the "post-redirection buffer." The auxiliary memory may then be relinquished to other uses, including, possibly, complete erasure. In the meantime, writing operations continue into buffer A (210 in FIG. 2).

At step 850, the process waits for a reconstruction opportunity. This reconstruction opportunity may arise while writing operations are being performed, or perhaps after they have stopped, there is a wait for a reconstruction opportunity in step 850. Reconstruction should take place before any information is read from the virtual auxiliary memory contained in buffers A, B, and C (210, 220, and 230 in FIG. 2). A reconstruction opportunity occurs, for example, when writing by the process has ceased. There may also be a pause in writing which is sufficiently long to perform reconstruction. It is also possible for reconstruction to take place while write operations are being performed.

The reconstruction takes place (step 860) which results in buffer A (210 in FIG. 2) containing a copy exactly replicating what would have been in the auxiliary memory had the redirection not occurred and the process not been evicted. This reconstruction consists of changing the contents of any memory location in buffer A (210 in FIG. 2) to the contents of the corresponding location in buffer C (230 in FIG. 2) if two conditions are true. The first is that the contents of the corresponding memory location in buffer B (220 in FIG. 2) is not equal to the contents of the corresponding memory location in buffer C (230 in FIG. 2). The second is that the contents of the corresponding memory location in buffer A (210 in FIG. 2) is equal to the contents of the corresponding memory location in buffer B (220 in FIG. 2).

Contents of the Buffers During the Technique

FIGS. 3-7 show the state of the memory and buffers at various points in the process of FIG. 8. Thus, these states and the point in the process of FIG. 8 at which they occur, are described below.

Figure 3:
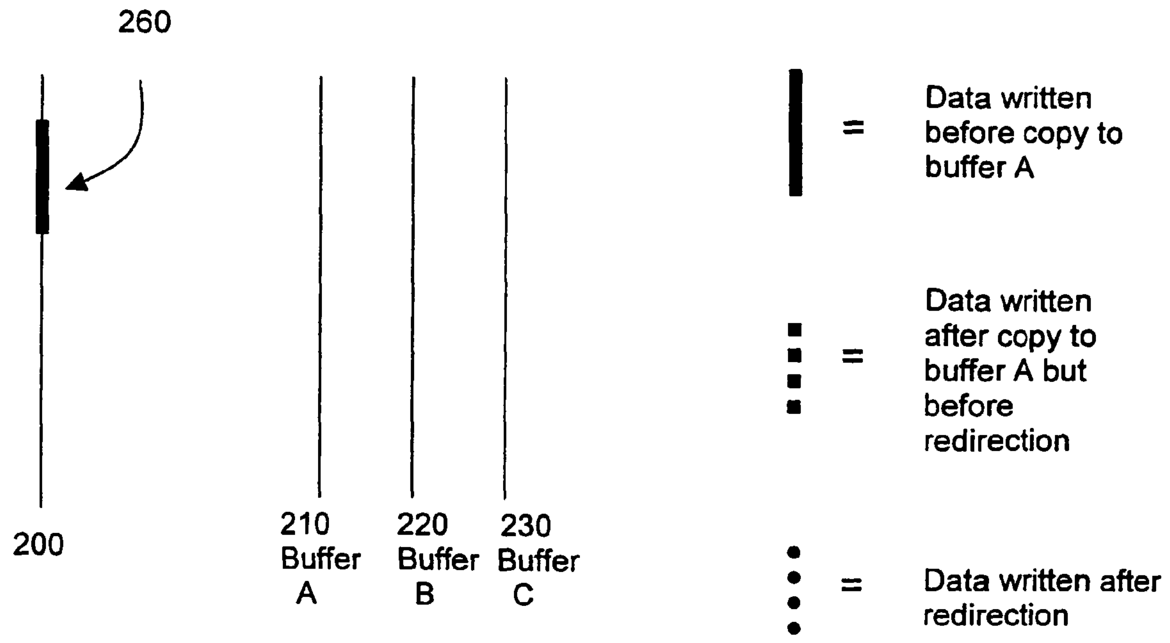
FIG. 3 is a block diagram of the contents of the auxiliary memory and three buffers in Phase I.

FIG. 3 shows the auxiliary memory 200 and buffers A, B, and C (210, 220, and 230, respectively). As indicated by the arrow, data is being written to auxiliary memory 200 by a process 260.

For clarity, the temporal phases of writing data to different locations will be numbered, and data will be referred to by the phase in which it was written by the process 260. Phase I is the phase shown in FIG. 3, where the process 260 is writing to auxiliary memory 200 and the three buffers, A, B, and C (210, 220, and 230, respectively) have been created.

Figure 4:
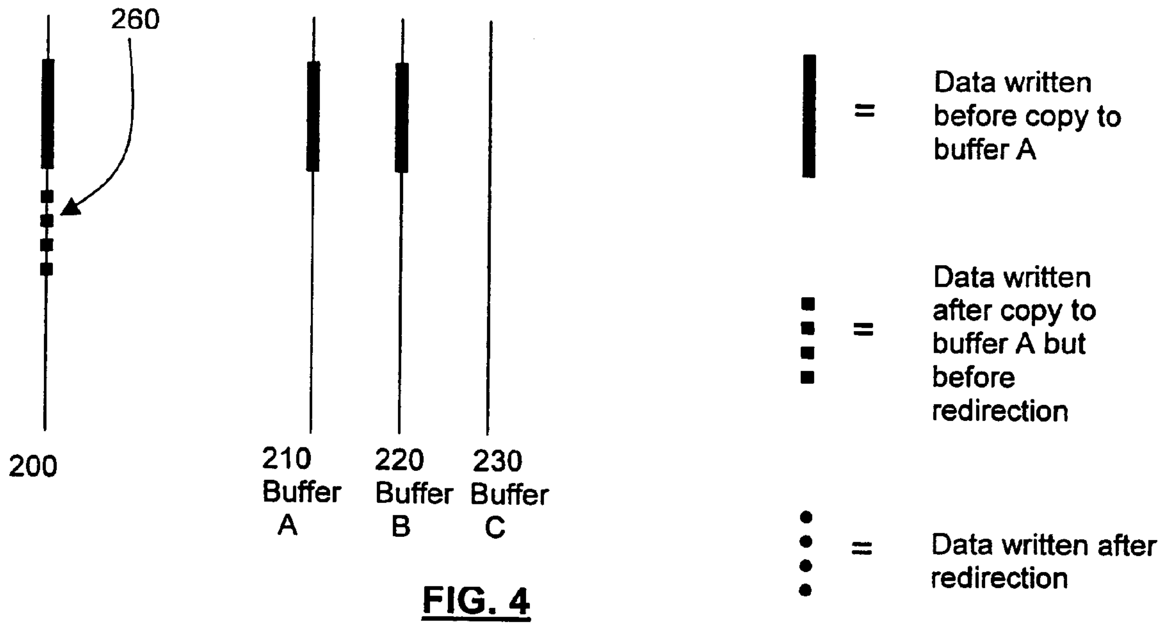
FIG. 4 is a block diagram of the contents of the auxiliary memory and three buffers after Phase II.

In Phase II (shown in step 810 of FIG. 8), a copy of the contents of auxiliary memory 200 is made into buffer A 210. When this is completed, a copy of the contents of buffer A 210 is made into buffer B 220 (step 820 of FIG. 8). FIG. 4 shows the state of the memory after Phase II, with the data written to auxiliary memory in Phase I (shown as a rectangle) copied into buffer A 210 and buffer B 220. Some data written during Phase I (that data written to a auxiliary memory location after that auxiliary memory location was copied into buffer A 210) and all data written during Phase II will not be included in the copies in buffer A 210 and buffer B 210. The only copy of this data, shown as squares in FIG. 4, is in the auxiliary memory during Phase II.

Figure 5:
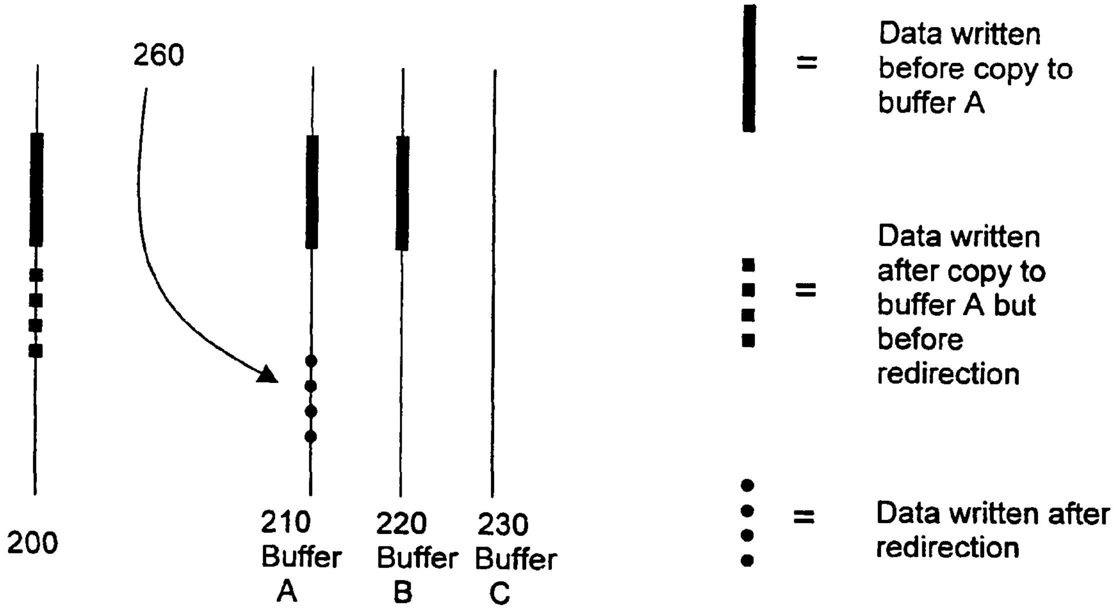
FIG. 5 is a block diagram of the contents of the auxiliary memory and three buffers during Phase III.

The state of the memory in Phase III is shown in FIG. 5. In Phase III, the process 260 is redirected to write into buffer A 210 rather than into auxiliary memory 200 (step 730 of FIG. 7). Data written in this phase is shown as circles in FIG. 5. In one embodiment, processes write to auxiliary memory 200 via a virtual address system, and the redirection to buffer A 210 is done by modifying the virtual address system to direct writes into buffer A 210.

Then, before relinquishing control of the auxiliary memory 200, and while writes are continuing into buffer A 210, a copy is made of the auxiliary memory 200 into buffer C 230. Control of auxiliary memory 200 is relinquished by the process 260 (step 840 of FIG. 8) and writing continues into buffer A 210.

Figure 6:
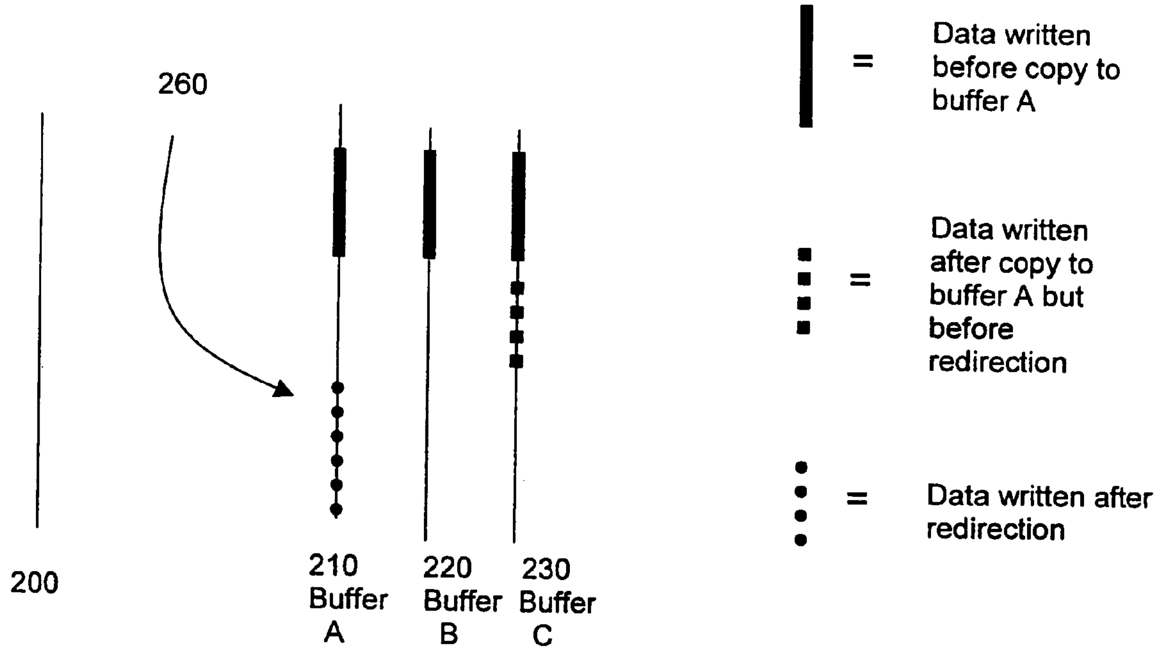
FIG. 6 is a block diagram of the contents of the auxiliary memory during Phase III.
Figure 7:
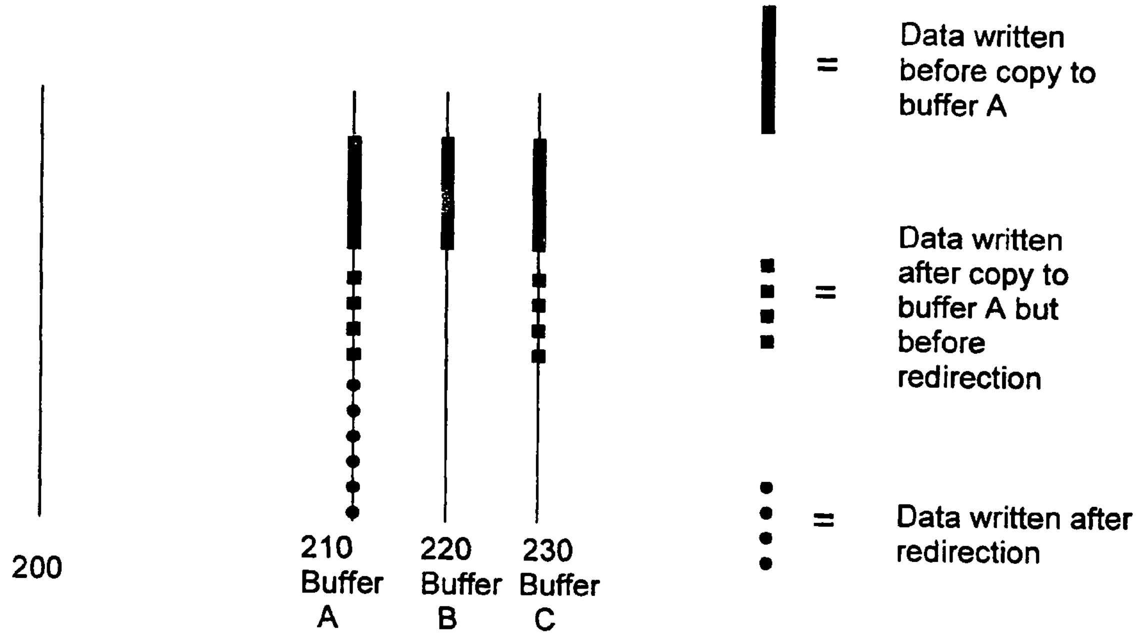
FIG. 7 is a block diagram of the contents of the auxiliary memory and three buffers following a reconstruction of the state of the auxiliary memory had redirection to the buffers not occurred.

The state of the memory when the process 260 has finished writing, is shown in FIG. 6. Buffer A 210 contains Phase I data (shown as a rectangle) and Phase III data (shown as circles.) Buffer B 220 contains Phase I data (shown as a rectangle.) Buffer C 230 contains Phase I data (shown as a rectangle) and the Phase I/Phase II data discussed above (shown as squares). Reconstruction of what the memory would have contained were it not for the redirection then commences. Reconstruction may also occur during a pause in the writing, or at other times when reconstruction and redirection would not interfere with the write operations.

When a reconstruction opportunity has been found (step 850 of FIG. 8) reconstruction is performed (step 860 of FIG. 8). An example of a reconstruction opportunity is when the process 260 has finished writing to the auxiliary memory. However, it will be understood that other opportunities for reconstruction exist, such as when the process 260 finishes all auxiliary memory operations, or when the process ends completely. In order to reconstruct a buffer that replicates what auxiliary memory 200 would have contained had control of the auxiliary memory not been relinquished, buffers A 210, B 220, and C 230 are examined byte by byte. (In the embodiment being described herein, memory operations are atomic on the byte level. In other embodiments, the examination is done at whatever the atomic level of memory operations is.)

If a byte from buffer B 220 is the same as the corresponding byte in buffer C 230, then that byte was not changed (or was changed and changed back) between the time that Phase I ended and the time that Phase III began, and no change needs to be made in buffer A 210. If that byte is different in buffer A 210, then it was changed in Phase III and the change supersedes any previous change. If a byte from buffer B 220 is different from a corresponding byte from buffer C 230 then that byte was changed in Phase II. The determination is then made whether the byte was changed again in Phase III or not. This is done by comparing the corresponding byte in buffer A 210 to the byte in buffer B 220. If they are different, then the byte was changed again in Phase III, and the byte in buffer A remains. If they are the same, then the byte in buffer C 230, from Phase II is the most recent byte, and the corresponding byte in buffer A 210 should be changed to the value of the byte from buffer B 220. Once this process is carried out for all bytes, as shown in FIG. 6, buffer A 210 will contain an accurate copy of the contents of the portion of auxiliary memory had no interruption occurred. This may then be used to rewrite the relevant section of auxiliary memory when that becomes possible again.

When a byte has a specific value before copying for redirection (in Phase I), and the process changes that byte after the copying (during Phase II), and then changes that byte back to the original value before redirection after redirection (in Phase III), the reconstruction will include the changed version and not the original value. Therefore, process described herein should only be used for processes that will not perform this rewriting (e.g. processes that write sequentially to memory or only once) or that can tolerate the possibility of erroneous data due to the use of the changed version. Additionally, processes that need to perform read operations from the memory may read incomplete or incorrect data from during Phases II and III, and therefore the inventive method should not be used for processes that require such reads and cannot accommodate the possibility of erroneous data due to the (possible) incompleteness of Buffer A during Phase III.

The technique of the present invention is, in one embodiment, implemented in an operating system kernel. In such an implementation, the method is preferably transparent to the process writing to auxiliary memory. It is understood that the invention will be useful in any situation where a copy of memory must be made while a process is writing to that memory and where performing this removal without stopping the writing process is desired.

CONCLUSION

In the foregoing description, it can be seen that the present invention comprises a new and useful mechanism for using virtual auxiliary memory to allow redirection of auxiliary memory operations without interruptions. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method for redirecting and reconstructing writing operations directed to a portion of a memory from a process running in a computer, where said portion comprises some or all of said memory, said method comprising:
   - storing a pre-redirection copy of said portion of said memory in a pre-redirection buffer and a redirection copy of the contents of said portion of said memory in a redirection buffer;
   - redirecting writing operations to write data to said redirection buffer;
   - storing a post-redirection copy of the contents of said portion of said memory in a post-redirection buffer after said step of redirecting writing operations; and
   - reconstructing said portion of said memory using said pre-redirection buffer, said redirection buffer, and said post-redirection buffer.

2. The method of claim 1, where said portion of said memory comprises all of said memory.

3. The method of claim 1, where said memory is a memory associated with a system that comprises one or more other memories, and where said pre-redirection buffer, said post-redirection buffer, and said redirection buffer are stored in said one or more other memories.

4. The method of claim 1, where said memory comprises a graphics memory.

5. The method of claim 1, where said step of reconstructing said portion of said memory is performed only after said writing operations directed to a portion of a memory from said process have been completed.

6. The method of claim 1, where said method is performed transparently to said process.

7. A system for redirecting and reconstructing writing operations directed to a portion of a memory from a process running in a computer system, where said portion comprises some or all of said memory, said system comprising:
   - a storage module that stores a pre-redirection buffer, a redirection buffer, and a post-redirection buffer;
   - a redirection module that, sequentially, stores a copy of the contents of said portion of said memory in said pre-redirection buffer and said redirection buffer, redirects said writing operations to said redirection buffer, and stores a copy of the contents of said portion of said memory in post-redirection buffer; and
   - a reconstruction module that reconstructs said portion of said memory using said pre-redirection buffer, said redirection buffer, and said post-redirection buffer.

8. The system of claim 7, where said portion of said memory comprises all of said memory.

9. The system of claim 7, where said memory is a memory associated with a system that comprises one or more other memories, and where said pre-redirection buffer, said post-redirection buffer, and said redirection buffer are stored in said one or more other memories.

10. The system of claim 7, where said memory comprises a graphics memory.

11. The system of claim 7, where reconstruction module reconstructs said portion of said memory only after said writing operations directed to a portion of a memory from said process have been completed.

12. The system of claim 7, where said process does not take different action based on whether said process is writing to said memory or to one of said buffers.

13. A computer-readable storage medium having stored thereon computer executable instructions for causing a computer to perform redirecting and reconstructing writing operations directed to a portion of memory from a process running in said computer, where said portion comprises some or all of said memory, comprising:
   - a pre-redirection buffer that receives a copy of said portion of memory before redirection of said writing operations occurs;
   - a post-redirection buffer that receives a copy of said portion of memory after redirection of said writing operations occurs; and
   - a redirection buffer that receives a copy of said portion of memory before redirection of said writing operations occurs, to which writing operations are redirected, and in which reconstruction of said portion of said memory occurs.

14. The computer-readable storage medium of claim 13, further comprising instructions that reconstruct said memory by performing acts comprising, for each memory location in said portion of said memory, (a) determining if the contents of the corresponding memory location of said pre-redirection buffer are different from the contents of the corresponding memory location of said post-redirection buffer; (b) if said contents of said corresponding location of said pre-redirection buffer are different from said contents of said corresponding memory location of said post-redirection buffer, determining if the contents of the corresponding memory location of said redirection buffer are equal to said corresponding memory location of said pre-redirection buffer; and (c) if said contents of said corresponding location of said pre-redirection buffer are different from said contents of said corresponding memory location of said post-redirection buffer and said contents of said corresponding memory location of said redirection buffer are equal to said corresponding memory location of said pre-redirection buffer, storing the contents of said corresponding memory location of said post-redirection buffer in the corresponding memory location of said redirection buffer.

15. The computer-readable storage medium of claim 13 where said portion of said memory comprises all of said memory.

16. The computer-readable storage medium of claim 13, where said memory is a memory auxiliary to one or more other memories, and where said pre-redirection buffer, said post-redirection buffer, and said redirection buffer are stored in said one or more other memories.

17. The computer-readable storage medium of claim 13, where said memory comprises a graphics memory.

18. The computer-readable storage medium of claim 13, where reconstruction of said portion of said memory is performed only after said writing operations directed to a portion of a memory from said process have been completed.

19. The computer-readable storage medium of claim 13, where said redirection and reconstruction is performed transparently to said process.

* * * * *